Figure 1:
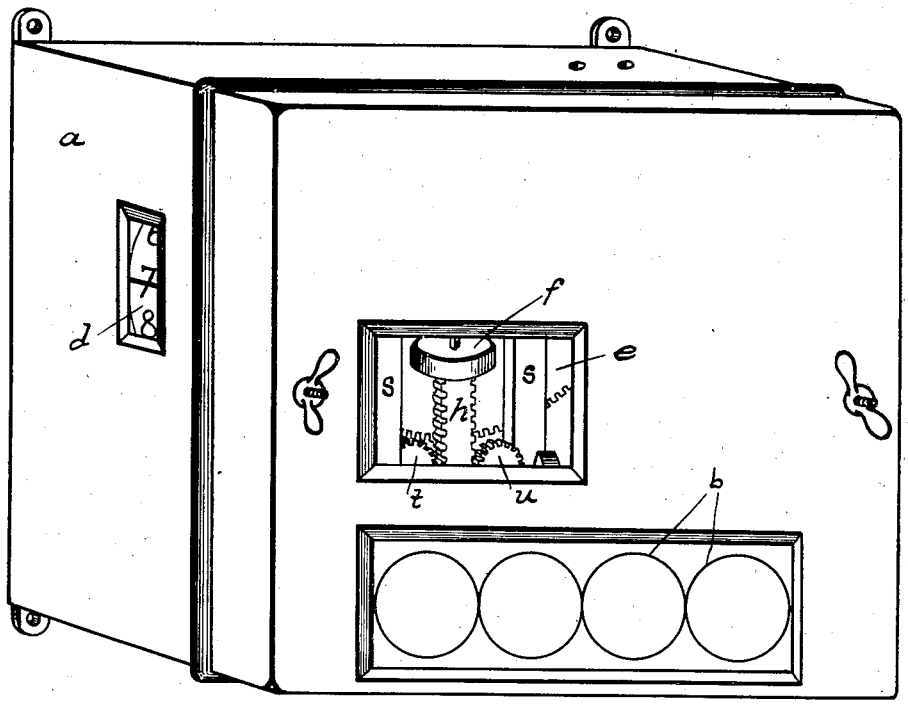

F. W. HILD.
AUTOMATIC MEANS FOR CORRECTING THE REGISTRATION OF METERS.
APPLICATION FILED FEB. 3, 1912.

1,172,706. Patented Feb. 22, 1916.

WITNESSES:

INVENTOR
F.W. Hild.
BY
ATTORNEY

UNITED STATES PATENT OFFICE.

FREDERIC W. HILD, OF PORTLAND, OREGON.

AUTOMATIC MEANS FOR CORRECTING THE REGISTRATION OF METERS.

1,172,706. Specification of Letters Patent. Patented Feb. 22, 1916.

Application filed February 3, 1912. Serial No. 675,372.

*To all whom it may concern:*

Be it known that I, FREDERIC W. HILD, a citizen of the United States, and a resident of Portland, county of Multnomah, and State of Oregon, have invented a new and useful Improvement in Automatic Means for Correcting the Registration of Meters, of which the following is a specification.

The general purposes I have in mind in connection with this invention are fully stated in the co-pending application for Letters Patent filed by me January 19, 1912, under No. 672,258, for meter for separately integrating periodic maximum and continuous service.

It is here sufficient to say that the specific object of this invention is to provide practical means for correcting the registration of the meter relatively to the peaks and valleys of a predetermined load curve, whereby the integrated measurements of the meter are increased and diminished with regard to the load imposed upon the central station; automatically rabbeting, as it were, the integrated measurements of the consumer's service during the periods when the central station is more or less idle, and making full registrations of the service during the period the central station must meet its maximum demand.

I have, furthermore, two distinct ideas in connection with the attainment of my objects, the purpose of one—the underlying idea—is the correction of the registration of the integrating measurements of the service relatively to an adapted standard, and by the other I have carried out a specific or practical method of attaining this result; I use, for example, in connection with the registering mechanism, devices operated by variable time-governed driving mechanism, means for varying the rate of speed of the driving mechanism, and a meter provided with an oscillating index hand, which is the governor of the speed adjusting means; and then I cause the action of the meter to be automatically varied relatively to a predetermined standard which may be conveniently expressed as the peaks and valleys of a predetermined load curve, and the latter may represent the variations in the demand of the service imposed upon the central station. Or more specifically stating my second purpose, it may be said to consist in providing means whereby the action of the meter is controlled, but not spasmodically, by jumps, as it were, as in the existing two-rate-meter, for example, but by causing the action of the meter to be gradually accelerated and retarded relatively to the predetermined standard.

One of the convenient modes of attaining my specific purpose is to control the oscillations of the index hand of the meter by a spring mounted on its spindle, and then control the stress in the spring by automatic devices connected with the driving mechanism of the registering devices. The means last referred to are more specifically described in this specification.

In the accompanying drawings constituting a part of this specification: Figure 1 is a perspective front view of my device, inclosed in a suitable case as appearing in practice; the circles representing the dials of the registering devices seen through the cover of the case; and Fig. 2 is a front elevation of one type of complete mechanism by which I attain my object; this figure also illustrates diagrammatically the wiring of the electrical devices.

The box, *a*, with its cover constitutes the case of my measuring apparatus.

Figure 2:
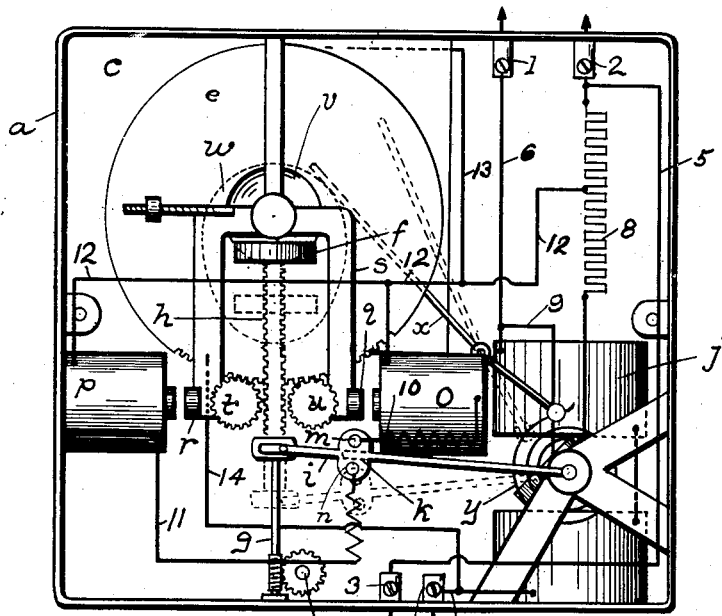

My device in its entirety comprises an electrically wound clock mechanism, not shown in these drawings being hidden by the plate *c* is adapted to rotate two disks, *d* and *e*, the former being seen only in Fig. 1, being covered in Fig. 2 by the disk *e*. The disk *d* is mounted on the hour post of the clock-like driving mechanism, and hence revolves at a rate of one revolution in twenty-four hours, and the disk *e* is mounted on the second post of the clock mechanism, and hence has a rate of one revolution in each minute of time. The disk *e* is the driving element in a variable power transmission from the clock mechanism to the registering devices, the dials of the latter are merely indicated by the circles, *b*, shown in Fig. 1.

The details of construction not directly concerned in this invention are not entered upon. A similarly operating device as the one here described is fully shown and described in my co-pending applications for Letters Patent filed by me January 15th, 1912, No. 671,391, and January 19, 1912, No. 672,256, entitled, respectively, registering meter and meter for separately integrating periodic maximum and continuous service.

The disk, *e*, constantly drives a friction pinion *f*, the latter being slidable on and rotating a shaft $g$. The shaft $g$, has its lower end formed as a worm meshing with and driving a pinion which is fixed on the shaft $g'$ for driving the dials $b$. A two-sided rack-bar $h$ is longitudinally slidable on, but not keyed to, the shaft $g$; said rack-bar is affixed to the friction pinion $f$ at one end and at its opposite end to an arm $i$, which is journaled on an axis common to that of the watt-meter $j$, whose oscillating hand or member $k$ lies normally parallel with the contact arm $i$ between the electric terminals $m$ and $n$, the latter being mounted on said arm $i$. The frictional contact between the pinion $f$ and the disk $e$ normally holds said pinion at any elevation to which it has been moved. The same result could be obtained by inclining the parts of this mechanism so as to cause motion in an oblique or horizontal plane instead of a vertical plane. The hand of the watt-meter $k$ is electrically connected to a source of electricity which energizes the electromagnets, $o$, $p$, and constitutes one element of a make-and-break in the circuits of the latter.

The armatures $q$ and $r$ of the magnets $o$ and $p$ are mounted on a rockable member or yoke $s$, on which are journaled two pinions $t$ and $u$, constantly rotated by the driving disk $e$. The latter is driven by clockwork mechanism not shown in this application, but fully shown in an application filed by me on January 15, 1912, under Serial Number 671,391, entitled: "Registering meter."

The devices last referred to are so arranged that attraction of either armature $q$ or $r$, by its related magnet, throws one or the other of the pinions $t$ or $u$ into mesh with the corresponding side of the two-sided rack-bar $h$, the movement of which positions the friction pinion $f$, as apparent.

The electromagnet circuit is normally broken at the terminals $m$ and $n$ by the watt-meter hand $k$, being spaced therefrom. The make-and-break of the electric circuit of the magnet element is operated by the variation in the electric current flowing through the watt-meter $j$. The outer end of the arm, $i$, carrying the terminals $m$ and $n$ is connected to the rack-bar $h$ in order that the movement of the latter will break contact of the hand $k$ with the terminal with which it is in contact, thereby breaking the electric circuit and leaving the friction pinion $f$ in the position to which it has been moved, and making its rate of rotation relative to the watt-meter indication.

The center of the disk, $e$, is cut away, as at $v$, so that no registration takes place when there is no load, for the pinion $f$ will then be positioned over said cavity $v$, as shown in Fig. 2.

Revolving with the disk $d$, which revolves once in twenty-four hours, is an eccentric, $w$, the periphery of which is formed to represent in its contour the peaks and valleys of a predetermined load curve, as appearing on the record sheet at the central station.

An auxiliary spring, $y$, is mounted on the spindle of the hand $k$. This spring is independent of the regular current carrying watt-meter springs, the latter not being shown in the drawings. A lever, $x$, connected to the spring $y$ and actuated by the eccentric $w$ regulates the tension of the spring $y$, so that during a "peak" load at the central station, represented by the long radius of the eccentric $w$, the tension on the spring $y$ would be less than during a normal load, as represented by the shorter radii of the eccentric $w$. Since the tension of the spring $y$ governs the movement of the hand $k$ for a given load, the indications of the watt-meter $j$ will be corrected relatively to the predetermined standard represented by the eccentric $w$.

Fig. 2 illustrates diagrammatically the internal wiring of the instrument, showing also the binding posts for the external connections. The line wires are inserted in the posts 1 and 2, and the load wires are inserted in the lower posts 3 and 4.

The line post 2 is connected directly to the load post 3 by wire 5, and the series coil of the watt-meter $j$ completes the connection of the wires 6 and 7, which join the line post 1 to the load post 4, placing this coil in series with the load. The inclined coil of the watt-meter $j$ parallels the load through the resistance 8 and wire 9, the latter being connected to the indicator $k$.

The terminals $m$ and $n$ are connected to their respective magnets $o$ and $p$ by the flexible wires 10 and 11. A branch wire 12 connects the magnets $o$ and $p$ to the post 2 through part of the resistance 8, thus completing the circuit.

The clock winding mechanism derives its energy through a circuit comprising the wire 13, which is a branch from the wire 12, and by the wire 14, joined to the wire 7.

I claim:

1. In an electricity measuring apparatus comprising an electricity meter including an index hand; a registering device; a constantly driven friction disk; a variable connection between the latter and the registering device, such connection including an adjustable pinion; means operable to position said pinion relatively to the center of said disk, and means for actuating said positioning means, the actuating means being controlled by the oscillation of said index hand.

2. In an electricity measuring apparatus comprising an electricity meter including an index hand; a registering device; a constantly driven friction disk; a variable connection between the latter and the registering device, such connection including an adjustable pinion; means operable to position said pinion relatively to the center of said disk, and means for actuating said positioning means, the actuating means controlled by the oscillation of said index hand; and the combination with said electricity meter of means for imposing a variable predetermined resistance to the oscillations of the index hand of said meter.

3. In an electricity measuring apparatus, the combination with an electricity meter including an index hand and a constantly driven disk, of means for imposing a variable predetermined resistance to the oscillations of the index hand of said meter, and such means coöperating with said driven disk.

4. In an electricity measuring apparatus, the combination with an electricity meter including an index hand and a constantly driven cam, of a stressed spring bearing on the spindle of said index hand, and a rockable member connected to the spring and operated by said cam whereby a variable stress is placed in said spring.

5. In a registering electricity meter, the combination with a constantly driven member of a shaft, a pinion driven by such constantly driven member, slidably mounted on said shaft which it rotates; such shaft being connected with registering mechanism; a double-faced rack-bar slidable on the shaft of the pinion and connected to the latter; a member movable transversely of said rack-bar; rack pinions journaled in such member at either side of the rack-bar, such pinions driven from said constantly driven member; armatures carried by the transversely movable member, electro-magnets located to attract such armatures respectively; an electricity meter having an oscillating hand connected with one pole of the circuit of the electromagnets; terminals in the respective circuits of said electromagnets, said terminals supported by a device capable of following the oscillations of the hand of said meter, said hand interposed between said terminals, and said device connected with said pinion so as to follow the movement of the same.

6. In a registering electricity meter, the combination with a constantly driven member, of a shaft, a pinion, driven by such constantly driven member, slidably mounted on said shaft which it rotates; such shaft being connected with registering mechanism; a double-faced rack-bar slidable on the shaft of the pinion and connected to the latter; a member movable transversely of said rack-bar; rack pinions journaled in such member at either side of the rack-bar, such pinions driven from said constantly driven member; armatures carried by the transversely movable member, electro-magnets located to attract such armatures respectively; an electricity meter having an oscillating hand connected with one pole of the circuit of the electromagnets; terminals in the respective circuit of said electromagnets, said terminals supported by a device capable of following the oscillations of the hand of said meter, said hand interposed between said terminals, and said device connected with said pinion so as to follow the movement of the same; and means for imposing a variable predetermined resistance to the oscillations of said index hand.

FREDERIC W. HILD.

Witnesses:
W. LEWIS COOP,
CECIL LONG.